US008433640B2

(12) United States Patent
Rooney

(10) Patent No.: US 8,433,640 B2
(45) Date of Patent: Apr. 30, 2013

(54) DYNAMIC SELECTION OF A QUOTING LEG BASED ON LIQUIDITY

(75) Inventor: Patrick J. Rooney, Saint Charles, IL (US)

(73) Assignee: Trading Technologies International, Inc., Chicago, IL (US)

( * ) Notice: Subject to any disclaimer, the term of this patent is extended or adjusted under 35 U.S.C. 154(b) by 286 days.

(21) Appl. No.: 12/638,081

(22) Filed: Dec. 15, 2009

(65) Prior Publication Data

US 2011/0145126 A1 Jun. 16, 2011

(51) Int. Cl.
*G06Q 40/00* (2012.01)

(52) U.S. Cl.
USPC .............................. 705/37; 705/35; 705/36 R

(58) Field of Classification Search .................... 705/37, 705/35, 36 R
See application file for complete search history.

(56) References Cited

U.S. PATENT DOCUMENTS

| | | | | |
|---|---|---|---|---|
| 7,243,083 | B2 | 7/2007 | Burns et al. | |
| 7,251,629 | B1 * | 7/2007 | Marynowski et al. | 705/37 |
| 7,389,264 | B2 | 6/2008 | Kemp, II et al. | |
| 7,437,325 | B2 | 10/2008 | Kemp et al. | |
| 7,542,938 | B1 | 6/2009 | Tam | |
| 7,596,528 | B1 * | 9/2009 | Herz | 705/37 |
| 7,599,880 | B1 | 10/2009 | Tam | |
| 7,844,541 | B2 | 11/2010 | Tam | |
| 7,848,991 | B1 * | 12/2010 | Buck | 705/37 |
| 7,991,668 | B2 * | 8/2011 | Zagara et al. | 705/35 |
| 2003/0009412 | A1 * | 1/2003 | Furbush et al. | 705/37 |
| 2003/0200167 | A1 | 10/2003 | Kemp et al. | |
| 2005/0203826 | A1 * | 9/2005 | Farrell et al. | 705/37 |
| 2010/0145874 | A1 * | 6/2010 | Janowski | 705/36 R |
| 2011/0040668 | A1 | 2/2011 | Lee et al. | |
| 2011/0040669 | A1 | 2/2011 | Lee et al. | |
| 2011/0246352 | A1 * | 10/2011 | Zagara et al. | 705/37 |

OTHER PUBLICATIONS

Peter Chapman, "A Program Trading Weapons Race: Brokers and Vendors Launch More User Products and Services", Traders Magazine, Apr. 1, 2004 (4 pages).
Unpublished U.S. Appl. No. 12/559,502, filed Sep. 15, 2009 entitled "System and Method for Quick Quote Configuration".

* cited by examiner

*Primary Examiner* — Jagdish Patel
*Assistant Examiner* — Kevin Poe
(74) *Attorney, Agent, or Firm* — McDonnell Boehnen Hulbert & Berghoff LLP

(57) ABSTRACT

Certain embodiments of the present inventions provide for dynamic selection of a quoting leg based on liquidity. Certain embodiments of the present inventions utilize various techniques for determining the liquidity of one or more legs. Certain embodiments provide for selecting a leg to quote based on the determined liquidity. Certain embodiments provide a configuration interface for specifying techniques to be used in determining a liquidity value for a particular tradeable object. Certain embodiments provide for liquidity indicators being presented in various user interfaces.

20 Claims, 9 Drawing Sheets

| Liquidity Determination Configuration | | |
|---|---|---|
| | CON1 Mar10 | CON2 Mar10 |
| Determine Liquidity Dynamically | Yes | Yes |
| Mode | Sum | Highest |
| Volume Traded Over Time (vs. Avg) | 5M | D |
| Volume on Inside Market (vs. Total QAP) | 5% | 5% |
| Quantity Available (vs. Threshold) | 100 | 150 |
| Quantity Available on Inside Market (vs. Total) | 20% | +2, 25% |
| Include Implieds in Quantity Available | Yes | Yes |
| # of Implied Sources | 3 | 3 |
| Price Volatility (Time, Threshold) | 1H, 7T | 1M, 10M |
| Bid-Ask Spread | 2T | BA |
| Order Size Impact | Lean Quantity | +1, 5 |
| Trading Range (Last Hour) | 25T | $100 |
| Recent Trade Size (# Trades, Size) | 5, 4A | 10, 6 |
| Fixed Liquidity (0.0 – 1.0) | 0.4 | 0.7 |

Figure 4

Leg A — 510 ● 520 [0.9] 530 [LIQUID]

| 11:25:15 | E/W | BidQ | Prc | AskQ | LTQ |
|---|---|---|---|---|---|
| -25 | | | 99950 | | |
| 956224 | | | 99925 | | |
| 0 | | | 99900 | | |
| | | | 99875 | | |
| 1  5 | | | 99850 | 1050 | |
| 1 | | | 99825 | 1171 | |
| 10  20 | | | 99800 | 1142 | |
| 50  100 | | | 99775 | 1054 | |
| CLR | | | 99750 | 750 | 42 |
| | | 642 | 99725 | | |
| SL¹ SM | | 986 | 99700 | | |
| Del All | | 1299 | 99675 | | |
| Delete 0 | | 1111 | 99650 | | |
| Delete 0 | | 817 | 99500 | | |

Leg B — 511 ○ 521 [0.2] 540 [QUOTE]

| 11:25:15 | E/W | BidQ | Prc | AskQ | LTQ |
|---|---|---|---|---|---|
| -5 | | | 95950 | | |
| 3130 | | | 95925 | | |
| 0 | | | 95900 | | |
| | | | 95875 | 6 | |
| 1  5 | S O W 1 | | 95850 | 2 | |
| 1 | | | 95825 | 2 | |
| 10  20 | | | 95800 | 4 | |
| 50  100 | | | 95775 | | |
| CLR | | 4 | 95750 | | 1 |
| | | 2 | 95725 | | |
| SL¹ SM | | | 95700 | | |
| Del All | | 1 | 95675 | | |
| Delete 0 | | 7 | 95650 | | |
| Delete 1 | | | 95500 | | |

550

560 570

| Liquidity Monitoring | | |
|---|---|---|
| | CON1 Mar10 | CON2 Mar10 |
| Volume Traded (Daily) (vs. Avg) | 0.60 | 0.40 |
| Volume Traded (Last 10 Ticks) (vs. Avg) | 0.45 | 0.55 |
| Volume Traded (Last 5 Minutes) (vs. Avg) | 0.38 | 0.62 |
| Quantity on Inside Market (vs. Total) | 0.45 | 0.55 |
| Quantity on Inside Market (+2) (vs. Total) | 0.52 | 0.48 |
| Quantity Available (any Implieds) (vs. Default Order Size) | 0.65 | 0.35 |
| Quantity Available (min 3 source Implieds) (vs. Default Order Size) | 1.0 | 0.0 |
| Bid-Ask Spread (vs. BA) | 0.25 | 0.75 |

Figure 5B

DYNAMIC SELECTION OF A QUOTING LEG BASED ON LIQUIDITY

BACKGROUND

The present inventions are directed towards electronic trading systems. More particularly, certain embodiments of the present inventions are directed towards dynamic selection of a quoting leg based on liquidity in electronic trading systems.

An electronic trading system provides for electronically matching orders to buy and sell items to be traded. The items may include, for example, stocks, options, futures contracts, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices.

In addition to trading single items, a trader may trade more than one item according to a trading strategy. One common trading strategy is a spread and trading according to a trading strategy may also be referred to as spread trading. Spread trading may attempt to capitalize on changes or movements in the relationships between the items in the trading strategy, for example.

A trading strategy may define a relationship between two or more items to be traded. Each item in a trading strategy may be referred to as a leg of the trading strategy. Once defined, items in the trading strategy may then be traded together according to the defined relationship.

Generally, a trader determines a desired price at which to buy or sell a particular trading strategy. Then, an automated trading tool, for example, attempts to achieve that desired price by buying and selling the legs at appropriate prices. For example, when a trader instructs the trading tool to buy or sell a trading strategy at a desired price, an automated trading tool may automatically place an order for one tradeable object to achieve the desired price for the trading strategy. The leg for which the order is placed may be referred to as the quoting leg. The other leg may be referred to as a lean leg and/or a hedge leg. The price that the quoting leg is quoted at is based on a target price that an order could be filled at in the lean leg. The target price in the lean leg is also known as the leaned on price, lean price, or lean level. Typically, if there is sufficient quantity available, the target price may be the best bid price when selling and the best ask price when buying. As the leaned on price changes, the price for the order in the quoting leg may also change to maintain the desired strategy price.

When the quoting leg is filled, the automated trading tool may then submit an order in the hedge leg to complete the strategy. This order may be referred to as an offsetting or hedging order and is typically quoted at the leaned on price. If the order at the leaned on price is not filled (or filled sufficiently to achieve the desired strategy price), then the trader is said to be "legged up" or "legged" because the trader has not achieved the desired strategy relationship according to the trading strategy definition.

Current systems, such as those described in U.S. Pat. Nos. 7,542,938 and 7,599,880, may allow manual or automatic selection of which leg is quoted. The quoting leg to be selected automatically based on, for example, market direction. However, current systems may not provide a desirable selection of which leg to quote in certain circumstances.

SUMMARY

Certain embodiments of the present inventions provide for dynamic selection of a quoting leg based on liquidity. Certain embodiments of the present inventions utilize various techniques for determining the liquidity of one or more legs. Certain embodiments provide for selecting a leg to quote based on the determined liquidity. Certain embodiments provide a configuration interface for specifying techniques to be used in determining a liquidity value for a particular tradeable object. Certain embodiments provide for liquidity indicators being presented in various user interfaces.

Certain embodiments provide a method for trading in an electronic trading environment including receiving a definition for a trading strategy, wherein the trading strategy includes a first tradeable object and a second tradeable object; receiving market data for the first tradeable object and the second tradeable object; receiving a desired strategy price; determining a first liquidity value for the first tradeable object based on the received market data; selecting a quoting leg based on the determined first liquidity value; and placing a quoting order for the tradeable object corresponding to the selected quoting leg.

Certain embodiments provide a computer readable medium having stored therein instructions executable by a processor to perform a method including receiving a definition for a trading strategy, wherein the trading strategy includes a first tradeable object and a second tradeable object; receiving market data for the first tradeable object and the second tradeable object; receiving a desired strategy price; determining a first liquidity value for the first tradeable object based on the received market data; selecting a quoting leg based on the determined first liquidity value; and placing a quoting order for the tradeable object corresponding to the selected quoting leg.

Other embodiments of the present inventions are described below. In addition, modifications may be made to the described embodiments without departing from the spirit or scope of the inventions.

BRIEF DESCRIPTION OF THE DRAWINGS

Example embodiments are described herein with reference to the following drawings.

FIG. 4 illustrates a liquidity determination configuration interface according to certain embodiments of the present inventions.

FIG. 5B illustrates a liquidity monitoring interface according to certain embodiments of the present inventions.

Figure 1:
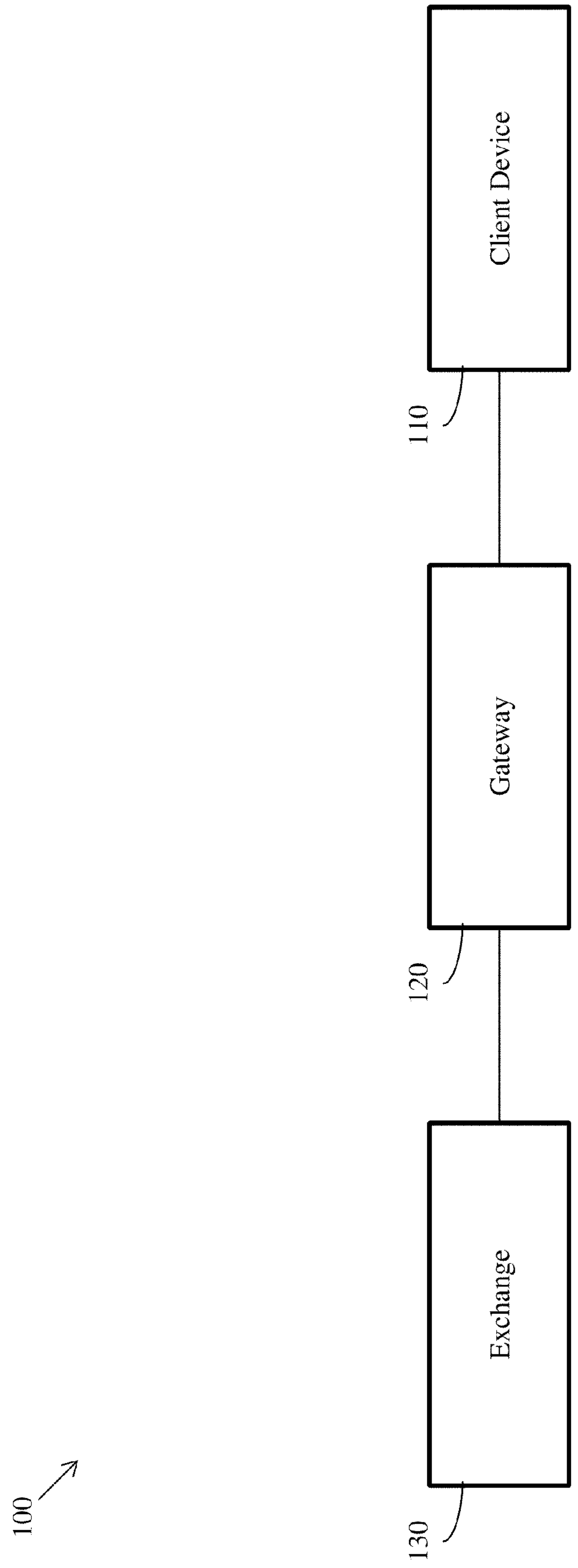
FIG. 1 illustrates a block diagram of an electronic trading system in which certain embodiments of the present inventions may be employed.

The foregoing summary, as well as the following detailed description, will be better understood when read in conjunction with the drawings which show certain embodiments of the present inventions. The drawings are for the purpose of illustrating certain embodiments, but it should be understood that the present inventions are not limited to the arrangements and instrumentality shown in the drawings.

DETAILED DESCRIPTION

Certain embodiments of the present inventions provide for dynamic selection of a quoting leg based on liquidity. Certain embodiments of the present inventions utilize various techniques for determining the liquidity of one or more legs. The liquidity may be predetermined or determined dynamically, for example. Certain embodiments provide for selecting a leg to quote based on the determined liquidity. The quoting leg may be selected manually or automatically, for example. For example, the quoting leg may be selected by an automated trading tool which monitors the liquidity of one or more legs of a trading strategy and automatically selects the quoting leg based on the determined liquidity. As another example, an automated trading tool which monitors the liquidity of one or more legs of a trading strategy may provide one or more indicators based on the determined liquidity and a trader may then manually select the quoting leg based on the provided indicators. Certain embodiments provide a configuration interface for specifying techniques to be used in determining a liquidity value for a particular tradeable object. Certain embodiments provide for liquidity indicators being presented in various user interfaces.

I. Example Electronic Trading System

FIG. 1 illustrates a block diagram of an electronic trading system 100 in which certain embodiments of the present inventions may be employed. The system 100 includes a client device 110, a gateway 120, and an electronic exchange 130. The client device 110 is in communication with the gateway 120. The gateway 120 is in communication with the exchange 130.

In operation, the client device 110 may be utilized by a user to send orders to buy or sell tradeable objects at the exchange 130. The orders are sent through the gateway 120 to the exchange 130. In addition, market data is sent from the exchange 130 through the gateway 120 to the client device 110. The user may also utilize the client device 110 to monitor this market data and base a decision to send an order for a tradeable object on the market data.

A tradeable object is anything which can be traded with a quantity and/or a price. For example, financial products such as stocks, options, bonds, futures, currency, warrants, funds derivatives, commodities, traded events, goods, and collections and/or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread created by a trader utilizing a client device 110.

The client device 110 may include one or more electronic computing platforms such as a hand-held device, laptop, desktop computer, workstation with a single or multi-core processor, server with multiple processors, and/or cluster of computers, for example.

The client device 110 may include one or more trading applications. The trading application(s) may, for example, process market data by arranging and displaying the market data in trading and charting windows. This processing may be based on user preferences, for example. The trading application(s) may include an automated trading tool such as an automated spread trading tool, for example.

The client device 110 may include an electronic trading workstation, a portable trading device, an algorithmic trading or "black-box" system, an embedded trading system, and/or an automated trading tool, for example. For example, the client device 110 may be a computing system running a copy of X_TRADER™, an electronic trading platform provided by Trading Technologies International, Inc. of Chicago, Ill. As another example, the client device 110 may be a computing device running the automated trading tool may Autospreader™, also provided by Trading Technologies International, Inc.

The client device 110 is adapted to send orders to buy or sell tradeable objects. The client device 110 may also be adapted to cancel orders, change orders, and/or query an exchange, for example.

The orders sent by the client device 110 may be sent at the request from a user or automatically, for example. For example, a trader may utilize an electronic trading workstation to place an order for a particular tradeable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the client device 110 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, the orders from the client device 110 are sent to the exchange 130 through the gateway 120. The client device 110 may communicate with the gateway 120 using a local area network, a wide area network, a virtual private network, a T1 line, a T3 line, an ISDN line, a point-of-presence, and/or the Internet, for example.

The gateway 120 is adapted to communicate with the client device 110 and the exchange 130. The gateway 120 facilitates communication between the client device 110 and the exchange 130. For example, the gateway 120 may receive orders from the client device 110 and transmit the orders to the exchange 130. As another example, the gateway 120 may receive market data from the exchange 130 and transmit the market data to the client device 110.

In certain embodiments, the gateway 120 performs processing on data communicated between the client device 110 and the exchange 130. For example, the gateway 120 may process an order received from the client device 110 into a data format acceptable by the exchange 130. Similarly, the gateway 120 may transform market data in an exchange-specific format received from the exchange 130 into a format understood by the client device 110. The processing of the gateway 120 may also include tracking orders from the client device 110 and updating the status of the order based on fill confirmations received from the exchange 130, for example. As another example, the gateway 120 may coalesce market data from the exchange 130 and provide it to the client device 120.

In certain embodiments, the gateway 120 provides services other than processing data communicated between the client device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, and/or the Internet, for example.

The exchange 130 is adapted to match orders to buy and sell tradeable objects. The tradeable objects may be listed for trading by the exchange 130. The orders may include orders received from the client device 110, for example. Orders may be received from the client device 110 through the gateway 120, for example. In addition, the orders may be received from other devices in communication with the exchange 130. That is, typically the exchange 130 will be in communication with a variety of other client devices (which may be similar to client device 110) that also provide orders to be matched.

The exchange 130 is adapted to provide market data. The market data may be provided to the client device 110, for example. The market data may be provided to the client device 110 through the gateway 120, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, the system 100 includes more than one client device 110. For example, multiple client devices similar to the client device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the client device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the client device 110 to trade at more than one exchange through the gateway 120, for example.

In certain embodiments, the client device 110 includes one or more computing devices or processing components. In other words, the functionality of the client device 110 may be performed by more than one computing device. For example, one computing device may generate orders to be sent to the exchange 130 while another computing device may provide a graphical user interface to a trader. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the client device 110. For example, the components of the gateway 120 may be part of the same computing platform as the client device 110. As another example, the functionality of the gateway 120 may be performed by components of the client device 110. In certain embodiments, the gateway 120 is not present. Such an arrangement may occur when the client device 110 does not need to utilize the gateway 120 to communicate with the exchange 130, for example. For example, if the client device 110 has been adapted to communicate directly with the exchange 130.

In certain embodiments, the gateway 120 is physically located at the same site as the client device 110. In certain embodiments, the gateway 120 is physically located at the same site as the exchange 130. In certain embodiments, the client device 110 is physically located at the same site as the exchange 130. In certain embodiments, the gateway 120 is physically located at a site separate from both the client device 110 and the exchange 130.

While not shown for the sake of clarity, in certain embodiments, the system 100 may include other devices that are specific to the communications architecture such as middleware, firewalls, hubs, switches, routers, exchange-specific communication equipment, modems, security managers, and/or encryption/decryption devices.

Figure 2:
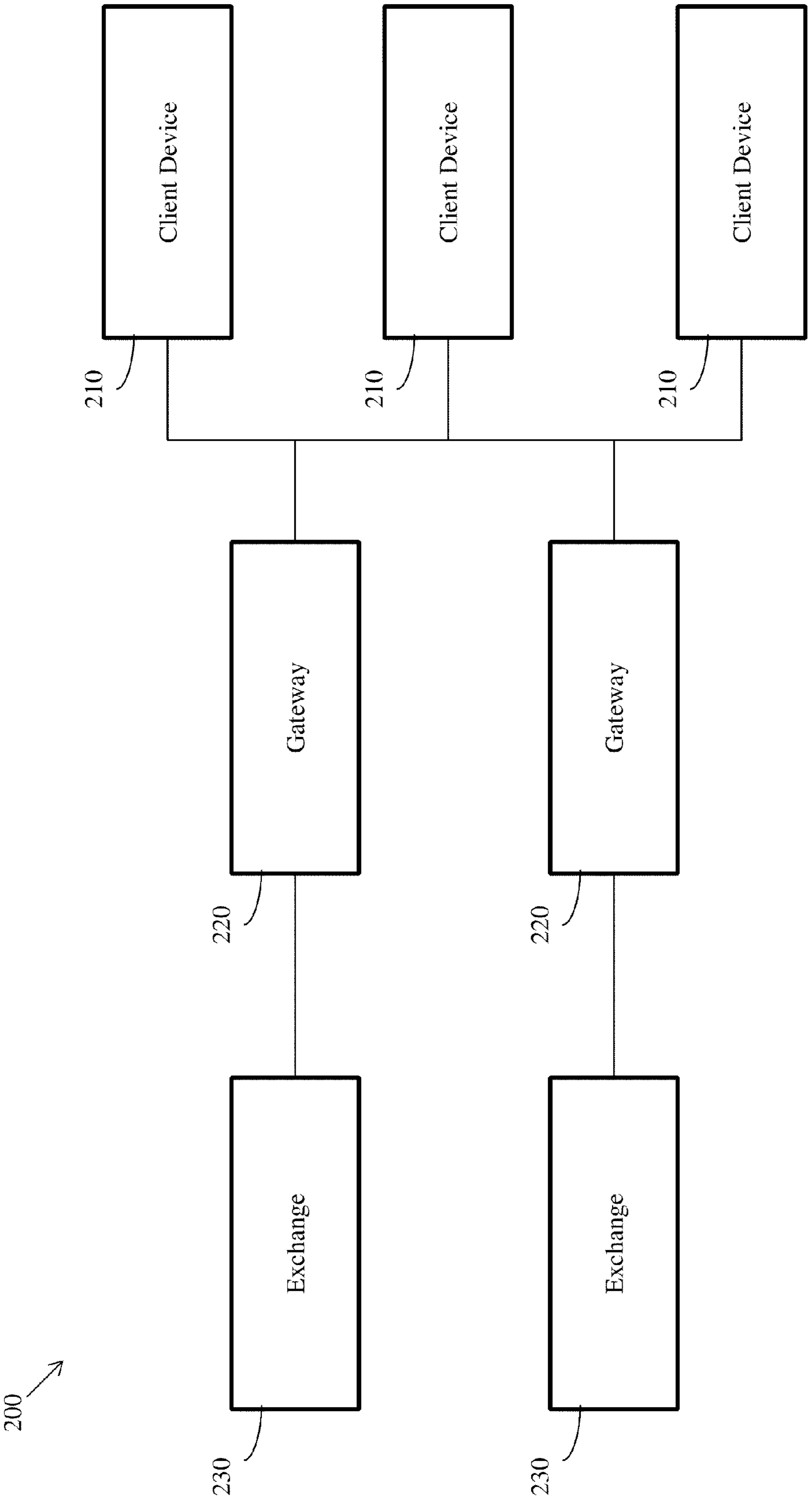
FIG. 2 illustrates a block diagram of an electronic trading system in which certain embodiments of the present inventions may be employed.

FIG. 2 illustrates a block diagram of an electronic trading system 200 in which certain embodiments of the present inventions may be employed. The system 200 includes one or more client devices 210, one or more gateways 220, and one or more electronic exchanges 230. The client devices 210 are in communication with one or more of the gateways 220. Each gateway 220 is in communication with a corresponding exchange 230.

One or more of the client devices 210 may be similar to the client device 110, discussed above, for example. One or more of the gateways 220 may be similar to the gateway 120, discussed above, for example. One or more of the exchanges 230 may be similar to the exchange 130, discussed above, for example.

In operation, a client device 210 may be utilized by a user to send orders to buy or sell tradeable objects listed at different exchanges 230. The orders are sent through one or more of the gateways 220 to one or more of the exchanges 230. In addition, market data is sent from the exchanges 230 through the gateways 220 to one or more of the client devices 210. The user may also utilize a client device 210 to monitor this market data and base a decision to send an order for a tradeable object on the market data.

In certain embodiments, a client device 210 is in communication with one of the gateways 220. In certain embodiments, a client device 210 is in communication with more than one of the exchanges 230.

In certain embodiments, a gateway 220 is in communication with one of the exchanges 230. In certain embodiments, a gateway 220 is in communication with more than one of the exchanges 230.

In certain embodiments, a client device 210 is adapted to communicate directly with one or more of the exchanges 230 and does not utilize a gateway 220.

The components, elements, and/or functionality of the systems 100 and/or 200 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

II. Strategy Trading

In addition to buying and/or selling a single tradeable object, a trader may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

A trader may utilize an automated trading tool to trade according to a trading strategy, for example. For example, the automated trading tool may Autospreader™ provided by Trading Technologies International, Inc. of Chicago, Ill.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 3:
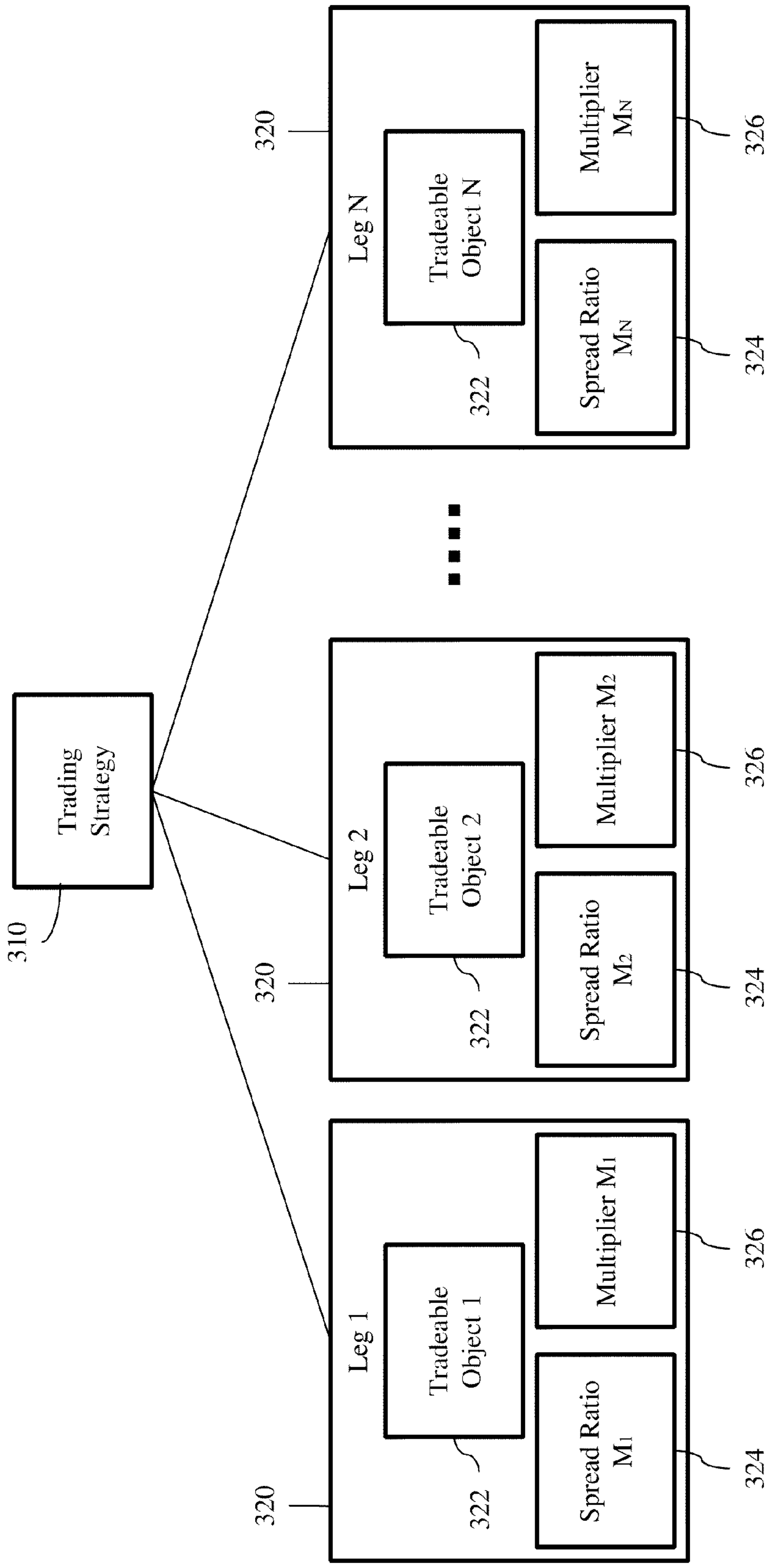
FIG. 3 illustrates a block diagram of a trading strategy which may be employed with certain embodiments of the present inventions.

FIG. 3 illustrates a block diagram of a trading strategy 310 which may be employed with certain embodiments of the present inventions. The trading strategy 310 includes "N" legs 320. The trading strategy 310 defines the relationship between the tradeable objects 322 for each of the legs 320 using the spread ratios 324 and multipliers 326 associated with each of the legs 320.

Once defined, the tradeable objects 322 in the trading strategy 310 may then be traded together according to the defined relationship. For example, assume that the trading strategy 310 is a spread with two legs 320. Leg 1 is for tradeable object A and Leg 2 is for tradeable object B. In addition, assume that the spread ratios 324 and multipliers 326 associated with Legs 1 and 2 are "1" and "−1," respectively. That is, the spread 310 is defined such that when the spread 310 is bought, 1 unit of tradeable object A is bought (positive spread ratio, same direction as the spread) and 1 unit of tradeable object B is sold (negative spread ratio, opposite direction of the spread). As mentioned above, typically in spread trading the opposite of the definition applies. That is, when the definition for the spread 310 is such that when the spread 310 is sold, 1 unit of tradeable object A is sold (positive spread ratio, same direction as the spread) and 1 unit of tradeable object B is bought (negative spread ratio, opposite direction of the spread).

The price for the trading strategy 310 is determined based on the definition. In particular, the price for the trading strategy 310 is typically the sum of price of the tradeable object 322 multiplied by the multiplier 326 for each of the legs 320 of the trading strategy 310. The price for a trading strategy may be affected by price tick rounding and/or pay-up ticks. However, both of these implementation details are beyond the scope of this discussion and are well-known in the art.

The discussion above applies whether the example spread is real or synthetic. Recall that, as discussed above, a real spread would be listed at an exchange, such as exchange 130 and/or 230, as a tradeable product. In contrast, a synthetic spread would not be list as a product at an exchange, but rather the various legs of the spread are tradeable at one or more exchanges. For the purposes of the following discussion, the trading strategy 310 is discussed as a synthetic trading strategy. However, similar techniques to those discussed below may also be applied by an exchange when a real trading strategy is being traded.

Continuing the example from above, if a trader believes that tradeable object A typically has a price 10 greater than tradeable object B, then the trader may want to buy the spread whenever the difference in price between tradeable objects A and B is less than 10 and sell the spread whenever the difference is greater than 10. As an example, assume that tradeable object A is at a price of 45 and tradeable object B is at a price of 40. The current spread price may then be determined to be (1)(45)+(−1)(40)=5, which is less than the typical spread of 10. Thus, the trader may buy 1 unit of the spread, which results in buying 1 unit of tradeable object A at a price of 45 and selling 1 unit of tradeable object B at 40. At some later time, the typical price difference may be restored and the price of tradeable object A is 42 and the price of tradeable object B is 32. At this point, the price of the spread is now 10. If the trader sells 1 unit of the spread to close out his position (that is, sells 1 unit of tradeable object A and buys 1 unit of tradeable object B), he has made a profit on the total transaction. In particular, while the trader bought tradeable object A at a price of 45 and sold at 42, losing 3, the trader sold tradeable object B at a price of 40 and bought at 32, for a profit of 8. Thus, the trader made 5 on the buying and selling of the spread.

The above example assumes that there is sufficient liquidity and stability that the tradeable objects can be bought and sold at the market price at approximately the desired times. This allows the trader to achieve the desired price for the spread 310. However, more generally, a trader determines a desired price at which to buy or sell a particular trading strategy. Then, an automated trading tool, for example, attempts to achieve that desired price by buying and selling the legs at appropriate prices. For example, when a trader instructs the trading tool to buy or sell the trading strategy 310 at a desired price, the automated trading tool may automatically place an order (also referred to as quoting an order) for one of the tradeable objects 322 of the trading strategy 310 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

When the quoting leg is filled, the automated trading tool may then submit an order in the hedge leg to complete the strategy. This order may be referred to as an offsetting or hedging order and is typically quoted at the leaned on price. If the order at the leaned on price is not filled (or filled sufficiently to achieve the desired strategy price), then the trader is said to be “legged up” or “legged” because the trader has not achieved the desired strategy relationship according to the trading strategy definition.

In addition to having a single quoting leg, as discussed above, a trading strategy may be quoted in multiple (or even all) legs. In such situations, each quoted leg still leans on the other legs. When one of the quoted legs is filled, the orders in the other quoted legs are typically cancelled and then appropriate hedge orders are placed based on the leaned on prices that the filled leg was based on.

III. Selection of a Quoting Leg Based on Liquidity

As discussed above, when a quoting leg is filled, orders are then placed in the hedge legs to complete the trading strategy. However, the markets for some tradeable objects are less liquid than others. As a result, it may be more difficult to achieve a desired price for a particular tradeable object in a less liquid market, so the strategy will either be legged or the desired strategy price will not be achieved. Thus, it may be more desirable to quote in such a market rather than to lean on such a market because, once a quoting leg is filled, it is desirable to fill orders in the hedge legs as quickly as possible so that the trading strategy will be completed. By doing so, some trading risk may be mitigated because there is a better chance that an order in the leaned on leg will be filled more quickly at the desired price.

Current systems may allow manual or automatic selection of which leg is quoted, as discussed above. Thus, current techniques may be generally satisfactory in some types of markets. However, current systems may perform undesirably in certain situations because such systems do not determine the liquidity of one or more legs and, based on the determined liquidity, select which leg to quote. As a result, current systems may expose a trader to unexpected risk, may not achieve the desired price for the trading strategy, and/or may leave the trader legged in one or more legs.

Certain embodiments of the present inventions utilize various techniques for determining the liquidity of one or more legs. The liquidity may be predetermined or determined dynamically, for example. Certain embodiments provide for selecting a leg to quote based on the determined liquidity. The quoting leg may be selected manually or automatically, for example. For example, the quoting leg may be selected by an automated trading tool which monitors the liquidity of one or more legs of a trading strategy and automatically selects the quoting leg based on the determined liquidity. As another example, an automated trading tool which monitors the liquidity of one or more legs of a trading strategy may provide one or more indicators based on the determined liquidity and a trader may then manually select the quoting leg based on the provided indicators. Certain embodiments provide a configuration interface for specifying techniques to be used in determining a liquidity value for a particular tradeable object. Certain embodiments provide for liquidity indicators being presented in various user interfaces.

The liquidity for a market for a particular tradeable object (also referred to herein as simply the liquidity for the tradeable object and/or the liquidity for a leg) may be represented in a variety of ways. For example, the liquidity may be represented as a binary value: is the market for the tradeable object liquid, “yes” or “no.” As another example, the liquidity may be represented as a parameter or weighting factor, such as a weight from 0.0 to 1.0. As another example, the liquidity may be represented as an absolute number such as the total quantity available in the market or the last traded quantity. As another example, the liquidity may be represented as a relative value, such as Leg B has three-times the liquidity of Leg A.

The liquidity of a market for a particular tradeable object may be determined using various techniques, discussed below. It should be understood that a value representing the liquidity of a market for a particular tradeable object (as discussed above) can be determined using these techniques. For example, determined values may be compared to a threshold for a binary representation of liquidity or normalized to fit a scale from 0.0 to 1.0. As another example, if multiple techniques are used, a liquidity value may be determined by using, for example, the highest, lowest, sum, average, or a weighted average of the individual values determined with each technique.

In certain embodiments, the liquidity is determined based on the volume traded. For example, the liquidity may be determined based on the total volume traded for a tradeable object since the start of trading for a day. As another example, the liquidity may be determined based on the average daily volume. If a contract has an average daily volume of 1000 contracts/day and a trader wants to trade 100 contracts (10% of the average daily volume), the liquidity may be determined to be low for this trade. If a contract has a traded volume of 500,000 contracts from the beginning of the trading day and a trader wants to trade 100 contracts (0.02% of the volume), then the contract may be determined to have high liquidity. A liquidity value may be determined by subtracting the percentage of the volume from 1.0 (thus, for 10%, liquidity value is 1.0−0.1 (10%)=0.9) or by taking the inverse of the percentage (thus, for 10%, liquidity value is 1/10=0.1 and for 0.02%, liquidity value is 1/0.02=50). As another example, the liquidity may be determined based on volume traded over the past 10 minutes or the past 2 hours. As another example, the liquidity may be determined based on historical intraday time periods. USD/JPY from 4 pm CST until 12 am CST historically has greater volume (and thus may be determined to have higher liquidity relative to other times of day or other tradeable objects, for example). As another example, the volume traded may be compared to the volume traded over a different time interval (for example, last five minutes versus last hour), a threshold, a default order quantity, or a current order quantity.

In certain embodiments, the liquidity is determined based on the volume on the inside market. For example, the liquidity may be determined based on the last traded quantity. As another example, the liquidity may be determined based on the total volume traded at the last traded price level. As another example, the volume traded on the inside market may be compared to the volume traded on the inside market over a different time interval (for example, last five minutes versus last hour), a threshold, a default order quantity, or a current order quantity.

In certain embodiments, the liquidity is determined based on the quantity available. For example, if the market is sparse, then the market may be considered to not be liquid. As another example, if the quantity available at the inside market is greater than the average quantity available at other price levels then the market met be considered liquid. As another example, the liquidity may be determined by comparing the quantity available at the best bid to the quantity available at the best ask. As another example, the liquidity may be determined by comparing the quantity available at the two best price levels on the bid to the quantity available at the two best price levels on the ask. As another example, the liquidity may be determined based on the quantity available at the inside market excluding implied quantity. As another example, the liquidity may be determined based on the quantity available at the inside market excluding implied quantities that do not originate from at least "x" sources.

In certain embodiments, the liquidity is determined based on price volatility. The price volatility is the price variance over a time period. For example, the time period may be a predefined number of minutes, hours, or days. The price volatility may be determined relative to another leg of the trading strategy or to a preceding time period, for example. For example, the price volatility for the preceding 10 minutes may be compared to the price volatility over the preceding hour.

In certain embodiments, the liquidity is determined based on the relationship between market data for the tradeable object. For example, a liquidity value may be determined by subtracting the best bid price from the best ask price (the bid-ask spread) and comparing it to a threshold value. As another example, a liquidity value may be determined by dividing the bid-ask spread by the last traded price (LTP) to normalize the bid-ask spread to the market. Consider the case of a tight spread, where the bid is 10, the ask is 11, and the LTP is 10: (11−10)/10=0.1. Now consider the case of a wide spread, where the bid is 10, the ask is 15, and the LTP 10: (15−10)/10=0.5. The tight spread, with the smaller value may be considered more liquid than the wide spread. A liquid market is exemplified by numerous market participants seeking pricing parity, which results in a smaller bid-ask spread. The best bid price, the best ask price, or the midpoint of the bid-ask spread might be used instead of the LTP to normalize the bid-ask spread to the market, for example. As another example, the liquidity may be determined to be higher when more quantity is available at subsequent price levels as compared to when less quantity is available at subsequent price levels. A market where the next lower price level from the best bid has a quantity of 10 available is more liquid than when the quantity available is only 5.

In certain embodiments, the liquidity is determined based on an order quantity. For example, liquidity may be determined based on the price impact of executing "x" contracts (a hypothetical order quantity) at the inside market. Price impact refers to how much the market moves when an order is executed. For example, if a trader has to sell 100 contracts at the market, they hope to minimize price impact and execute all sales at the current inside market. However, if there is not enough quantity available at the current inside market (here, the best bid), some of the contracts may get filled at a worse price (here, a lower price). The order quantity may be predefined, specified by a user, or based on an average quantity size for previously traded by the user for the particular tradeable object, for example.

In certain embodiments, the liquidity is determined based on a trading range. For example, liquidity may be determined to be lower when the tradeable object is trading in a narrow range of prices. As another example, liquidity may be determined be higher when the tradeable object is trading in a larger range of prices.

In certain embodiments, the liquidity is determined based on the quantity of recent trades. For example, if the last 5 trades were for a small quantity, liquidity may be determined to be low, whereas if the last 20 trades were for a large quantity, liquidity may be determined be high.

In certain embodiments, the liquidity is predetermined. For example, the liquidity for a particular tradeable object may be determined based on historical data. As another example, the liquidity for a particular tradeable object may be set by a trader.

In certain embodiments, the liquidity is determined dynamically. For example, the liquidity may be determined in real time using one or more of the techniques discussed above. The liquidity of a leg may change over time, for example. If the liquidity is not determined dynamically, it may be determined only once. The non-dynamically determined liquidity value may be determined based on initial data, historical data, or predetermined, for example.

FIG. 4 illustrates a liquidity determination configuration interface 400 according to certain embodiments of the present inventions. The configuration interface 400 allows a user to specify fields 411-424 in column 410 and values for one or more tradeable objects in columns 451 and 452. The various fields 411-424 are exemplary and, while all of them may not be used as shown, one or more might be used in various embodiments. The fields 411-424 allow for one or more techniques to be specified to be used in determining the liquidity for a particular tradeable object. The values specified for the fields 411-424 may be in a variety of different formats, as appropriate to the particular field. For example, some fields may take Boolean values (for example, true/false, yes/no, 1/0), some may specify a time value in different ways (for example, "5M" may mean "five minutes," "D" may mean "one day," "10T" may mean "previous 10 ticks"), and some may specify values in different ways (for example, "$100" may mean "one hundred dollars" and "25T" may mean "twenty-five ticks").

Field 411 specifies whether the liquidity value should be determined dynamically. If set to "Yes," the liquidity may be determined continuously, reflecting changes in data over time, for example. If set to "No," the liquidity may only be determined once based on initial or historical data or may be predetermined, for example. For example, a user may specify a fixed liquidity value to be used using field 424.

Field 412 specifies the mode to be used in determining a liquidity value based on the techniques specified in column 410. For example, the liquidity values determined by each specified technique may be summed to determine the liquidity value for the tradeable object. As another example, a weighted average of the liquidity values determined with the specified techniques may be used as the liquidity value for the tradeable object. As another example, the highest determined liquidity value may be used as the liquidity value for the tradeable object. As another example, if any of the specified techniques determine liquidity the tradeable object may be determined to be liquid.

Field 413 specifies that liquidity should be determined based on the volume traded over time. As illustrated in FIG. 4, the liquidity is determined by looking to the volume traded over the time interval versus the average volume traded over the same time interval. For example, for tradeable object "CON1 Mar10", the traded volume over the last five minutes ("5M") is compared to the average volume traded over all five minute intervals to determine the liquidity value. As another example, for tradeable object "CON2 Mar10," the traded volume for the day ("D") is compared to the average daily volume to determine the liquidity value. In this case, the average daily volume may be prorated to match the time period over which the total volume for the day has been determined. The volume traded over time may be compared to values other than the average volume over the same interval. For example, the volume traded over the specified time may be compared to the volume traded over a different time interval (for example, last five minutes versus last hour), a threshold, a default order quantity, or a current order quantity.

Field 414 specifies that liquidity should be determined based on the volume on the inside market. For example, as illustrated in FIG. 4, the last traded quantity is compared to the total quantity traded at the last traded price level and if that value is above the specified threshold percentage (here, 5%), then the market may be considered liquid. The volume traded on the inside market may be compared to values other than the total volume at the last traded price level. For example, the volume traded on the inside market may be compared to the volume traded on the inside market over a different time interval (for example, last five minutes versus last hour), a threshold, a default order quantity, or a current order quantity.

Field 415 specifies that liquidity should be determined based on the total quantity available in the market versus a specified threshold value. For example, as illustrated in FIG. 4, for tradeable object "CON2 Mar10," the total quantity available is compared to the threshold value of 150 to determine liquidity. The total quantity available in the market may be compared to values other than a specified threshold value. For example, the total quantity available in the market may be compared to the total quantity available in the market at a different time (for example, current quantity available versus quantity available one hour ago), a default order quantity, or a current order quantity.

Field 416 specifies that liquidity should be determined based on the quantity available in the inside market. For example, as illustrated in FIG. 4, for tradeable object "CON1 Mar10," the tradeable object may be considered liquid if the quantity available at the inside market exceeds the specified threshold (20%) of the total quantity available. As another example, as illustrated in FIG. 4, for tradeable object "CON2 Mar10," the quantity available at the inside market plus two levels on either side of the inside market ("+2") is compared to the specified threshold (25%) of the total quantity available. The quantity available in the inside market may be compared to values other than the total quantity available. For example, the quantity available in the inside market may be compared to the quantity available in the inside market at a different time (for example, current quantity available versus quantity available ten minutes ago), a threshold, a default order quantity, or a current order quantity.

Field 417 specifies whether implied quantities should be considered in techniques which utilize the quantity available. For example, as shown in FIG. 4, implied sources should be considered when field 417 is set to "Yes." Field 418 allows a minimum number of sources for an implied quantity to be specified before counting such an implied quantity. For example, as shown in FIG. 4, even though implied quantity should be considered (as specified in Field 417), only those implied quantities from at least three sources should be considered (as specified in Field 418).

Field 419 specifies that liquidity should be determined based on price volatility. For example, as illustrated in FIG. 4, for tradeable object "CON1 Mar10," the tradeable object may be considered liquid if the price volatility over the specified time period of one hour ("1H") was less than the specified threshold of seven ticks ("7T"). As another example, as illustrated in FIG. 4, for tradeable object "CON2 Mar10," the liquidity value is determined by comparing the price volatility over the specified time period of the last minute ("1 M") to the price volatility over the specified time period of the last ten minutes ("10 M").

Field 420 specifies that liquidity should be determined based on the spread between the best bid price and the best ask price (the bid-ask spread). For example, as illustrated in FIG. 4, for tradeable object "CON1 Mar10," the tradeable object may be considered liquid if the bid-ask spread is less than or equal to the specified threshold of two ticks ("2T"). As another example, as illustrated in FIG. 4, for tradeable object "CON2 Mar10," the liquidity value is determined based on the bid-ask spread normalized by the best ask price ("BA"). The bid-ask spread could be normalized using, for example, the best bid price, the last traded price, or an average of the best bid and best ask prices.

Field 421 specifies that liquidity is determined based on the impact of a particular order size. For example, as illustrated in FIG. 4, for tradeable object "CON1 Mar10," the tradeable object may be considered liquid if the desired lean quantity can be filled at the inside market. If no desired lean quantity has been specified, then the default order size may be used or the average desired lean quantity may be used. As another example, as illustrated in FIG. 4, for tradeable object "CON2 Mar10," the tradeable object may be considered liquid if the specified quantity of five ("5") can be filled within one price level of the inside market ("+1").

Field 422 specifies that liquidity should be determined based on the trading range. For example, as illustrated in FIG. 4, for tradeable object "CON1 Mar10," the tradeable object may be considered liquid if the trading range for the last hour is less than or equal to the specified threshold of twenty five ticks ("25T"). As another example, as illustrated in FIG. 4, for tradeable object "CON2 Mar10," the tradeable object may be considered liquid if the trading range for the last hour is less than or equal to the specified threshold of one hundred dollars ("$100").

Field 423 specifies that liquidity should be determined based on recent trade sizes. For example, as illustrated in FIG. 4, for tradeable object "CON1 Mar10," the tradeable object may be considered liquid if the specified number of the five most recent trades ("5") had an average size less than the specified threshold of five ("5A"). As another example, as illustrated in FIG. 4, for tradeable object "CON2 Mar10," the tradeable object may be considered liquid if the specified number of the ten most recent trades ("10") were all less than the specified threshold of six ("6").

Field 424 specifies a fixed liquidity value to be used for the tradeable object. Depending on the representation of the liquidity value used, the fixed liquidity value may be provided in a variety of ways. For example, the fixed liquidity value may be specified as "Liquid" or "Not Liquid." As another example, the fixed liquidity value may be specified as a constant in the range of 0.0 to 1.0.

In certain embodiments, an indicator of the liquidity of a leg is provided. For example, an indicator may be provided in a user interface for an automated trading tool. The indicator may be a colored icon or a number, for example. For example, each displayed leg of a trading strategy being traded with an automated trading tool may have a red/green icon that indicates whether the leg is liquid. As another example, the name of the most liquid tradeable object in a trading strategy may be displayed as the indicator.

Figure 5A:
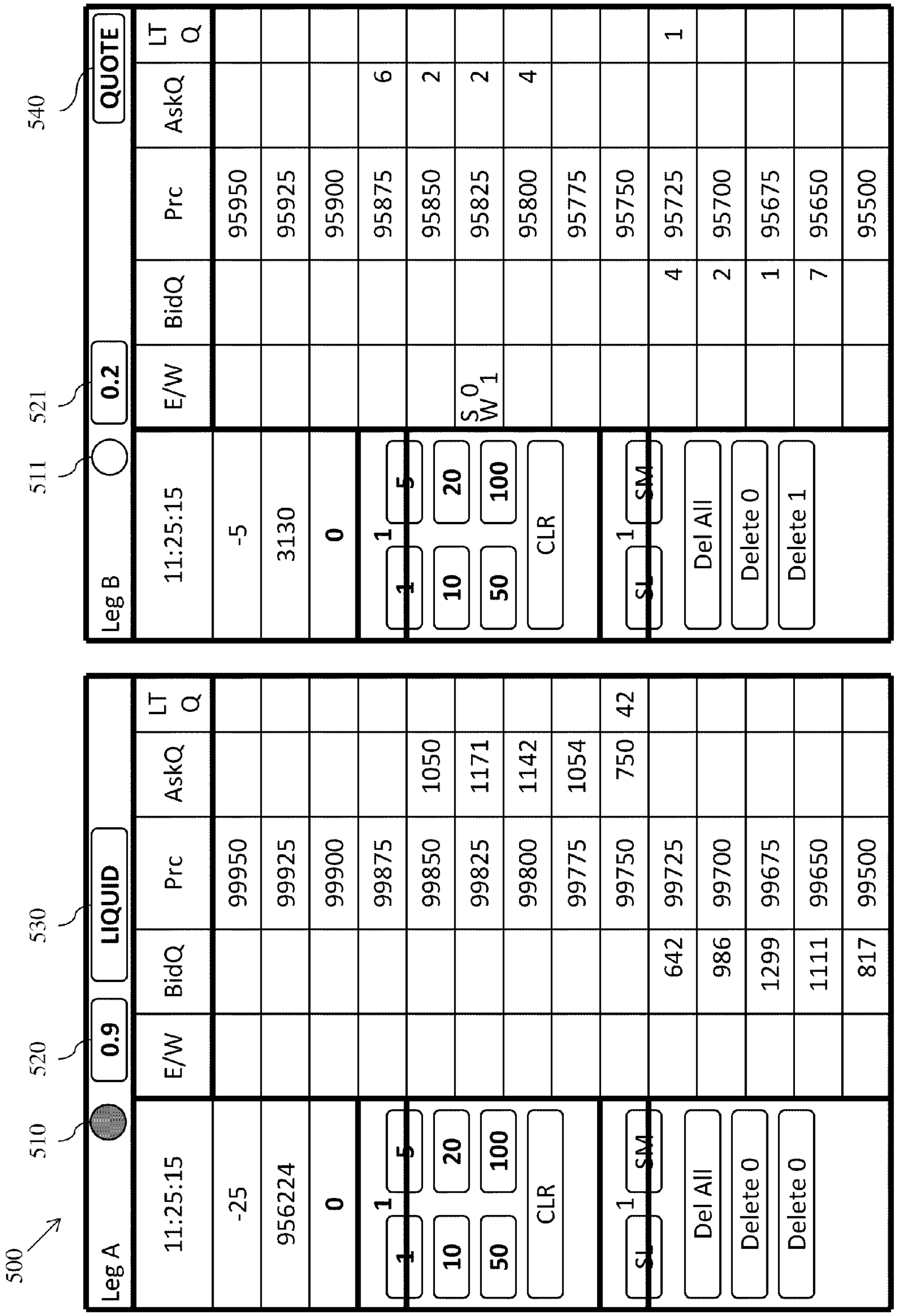
FIG. 5A illustrates a trading interface for trading in an electronic trading system in which certain embodiments of the present inventions may be employed.

FIG. 5A illustrates a trading interface 500 for trading in an electronic trading system in which certain embodiments of the present inventions may be employed. The trading interface 500 illustrates a variety of example indicators 510, 511, 520, 521, 530, and 540, one or more of which might be used in various embodiments. Indicators 510 and 511 are color-coded icons that indicate whether a leg is liquid. As illustrated, indicator 510 is dark (indicating, for example, liquidity or more liquidity) and indicator 511 is lighted (indicating, for example, little or no liquidity, less liquidity, or insufficient liquidity). Indicators 520 and 521 display a liquidity value for their respective legs as a parameter from 0.0 to 1.0. Indicator 520 shows a liquidity value of "0.9" (more liquid) whereas indicator 521 shows a liquidity value of "0.2" (less liquid). Indicator 530 is a textual identifier that identifies Leg A as "liquid." Note that Leg B does not have such an indicator, which, in the context of this example, indicates that it is not liquid. Similarly, indicator 540 is a textual identifier that identifies Leg B as the leg to be quoted. Note that Leg A does not have such an indicator, which in the context of this example, indicates that it is not a leg to be quoted. Thus, one or more of the various indicators 510, 511, 520, 521, 530, and 540 and/or other indicators may be used in various embodiments to indicate the liquidity of one or more legs and/or indicate, based on the determined liquidity, which legs should be quoting legs and which legs should be hedge legs. Other indicators may also be used. For example, an indicator similar to indicators 520 and/or 521 may include gradient shading to indicate the level of liquidity. The darker the indicator, the greater the liquidity, for example. As another example, a thermometer-style indicator may be used to indicate the liquidity with respect to a scale or predetermined range.

FIG. 5B illustrates a liquidity monitoring interface 550 according to certain embodiments of the present inventions. The liquidity monitoring interface 550 illustrates indicators providing example liquidity values 570 determined using various techniques 560. The specified techniques 560 may be similar to the techniques discussed above, for example. The techniques 560 may be specified by a liquidity determination configuration interface similar to liquidity determined configuration interface 400, discussed above, for example. In addition, the techniques 560 may include other techniques not specified by a liquidity determination configuration interface. For example, while a liquidity determination configuration interface may specify that volume traded over time versus the average should be determined using a particular time interval, the liquidity monitoring interface 550 may provide liquidity values for volume traded at a variety of intervals. Such additional liquidity values may be used by a trader for comparison purposes in selecting a desired configuration, for example. As illustrated in FIG. 5B, the liquidity values 570 have been normalized to a 0.0 to 1.0 scale. Other representations may also be used, as discussed above.

An indicator of the liquidity for a tradeable object may be provided in other contexts as well. For example, an indicator may be provided in a liquidity grid or alongside a tradeable object indicator in another application such as a linked spreadsheet. As another example, an indicator may be provided for a tradeable object on a chart or graph. As another example, an indicator may be a chart or graph of a liquidity value (and/or the components of a liquidity value when multiple techniques are used).

Figure 6:
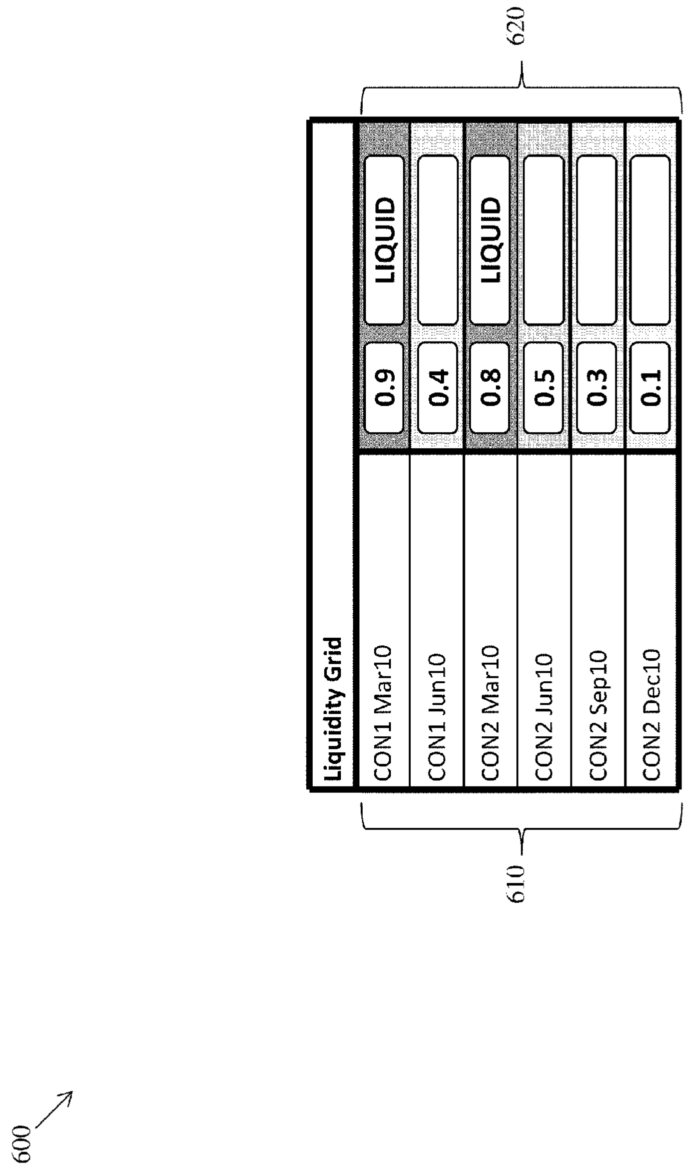
FIG. 6 illustrates a user interface in which certain embodiments of the present inventions may be employed.

FIG. 6 illustrates a user interface 600 in which certain embodiments of the present inventions may be employed. The user interface 600 illustrates a liquidity grid application which includes a list of tradeable objects 610 and corresponding liquidity indicators 620. The liquidity indicators may be similar to the liquidity indicators discussed above, for example. A user of the user interface 600 may add or remove tradeable objects from the list 610 through a command. For example, a user might use a drag and drop action to drag a tradeable object indicator from a list of tradeable object indicators to the user interface 600. When the tradeable object indicators is dropped on the user interface 600, an entry is made in the list of tradeable objects 610 corresponding to the tradeable object and a liquidity indicator for the tradeable object is displayed in the list of liquidity indicators 620. The liquidity for the tradeable object may be determined based on one or more techniques specified by a configuration interface. The configuration interface may be similar to the configuration interface 400, discussed above, for example.

Based on the determined liquidity for one or more legs of a trading strategy, a leg to quote is selected. It should be understood that a leg to lean on may, in addition or in the alternative, be selected based on the determined liquidity for one or more legs for the trading strategy. For clarity, the following discussion is with respect to selecting a quoting leg, but it should be understood that selecting a hedge leg based on the determined liquidity may be similarly provided in certain embodiments.

In certain embodiments, the quoting leg is selected manually based on an indicator of liquidity. The indicator of liquidity may be similar to the indicators discussed above, for example. For example, a trader may manually select the quoting leg based on an indicator in a trading application indicating the determined liquidity. The quoting leg may be selected via an input device, for example. As another example, the quoting leg may be selected in response to receiving a command from a user.

In certain embodiments, the quoting leg is selected automatically. For example, an automated trading tool may automatically select a quoting leg based on the determined liquidity. The automated trading tool may select a less liquid leg to quote and thus lean on a more liquid leg, for example. As another example, an automated trading tool may quote in each leg with a determined liquidity above or below a threshold value. This may alternatively be viewed as the automated trading tool not quoting in a leg with a determined liquidity below or above (respectively) a threshold value (that is, only leaning on such a leg). If all legs meet the threshold to be selected for quoting, the automated trading tool may quote all of the legs. If all of the legs do not meet the threshold to be selected for quoting (or, all legs meet the threshold to be selected to be leaned on), then no legs may be selected for quoting. In this case, the strategy order may be viewed as being on hold because no legs meet the criteria to be selected as a quoting leg. As another example, an automated trading tool may select the least liquid or the most liquid leg to quote. As another example, an automated trading tool may select the two least liquid or two most liquid legs to quote. As another example, an automated trading tool may select all legs to quote except the most liquid or least liquid.

As discussed above, the liquidity of one or more legs of a trading strategy may change over time. Thus, the selected quoting leg may change. For example, consider the situation of a spread with two legs (Leg A and Leg B), where Leg A has initially been selected to be quoted because Leg B is the leg determined to have more liquidity. If the liquidity of Leg B decreases and/or the liquidity of Leg A increases, Leg A may become the leg determined to have more liquidity. As a result, an automated trading tool may switch the quoting leg from Leg A to select Leg B as the quoting leg. The automated trading tool may automatically enter a new order to buy or sell the tradeable object of Leg B at a price based on the desired strategy price. The automated trading tool may also automatically cancel a quoting order in Leg A.

In certain embodiments, the selection of the quoting leg is based on factors in addition to the determined liquidity. For example, the quoting leg may be selected based at least in part on market direction. As another example, the quoting leg may be selected based at least in part on a technical indicator such as Bollinger Bands, Relative Strength Index, Stochastics, Moving Average Crossover, and volume.

In certain embodiments, a trader may manually override a selected quoting leg. For example, if Leg A is automatically selected to be the quoting leg based on the determined liquidity, a trader may manually override the selected quoting leg to be Leg B. In certain embodiments, a selected quoting leg may be automatically overridden. For example, if a trader manually selected Leg A to be the quoting leg based on a liquidity indicator, an automated trading tool may automatically override the selected quoting leg to be Leg B because another factor may have higher priority than the determined liquidity.

In certain embodiments, a user might prefer some other action be taken besides cancelling an order when the quoting leg is switched. For example, the order may be cancelled after a predetermined timeout, the order may be moved to a price that is further off the inside market than the current order price rather than cancelling it, the order quantity may be changed (such as by deleting only a portion of the order quantity), the order type may be changed, or some other user-definable action may be taken on the order.

IV. Example Embodiments

Figure 7:
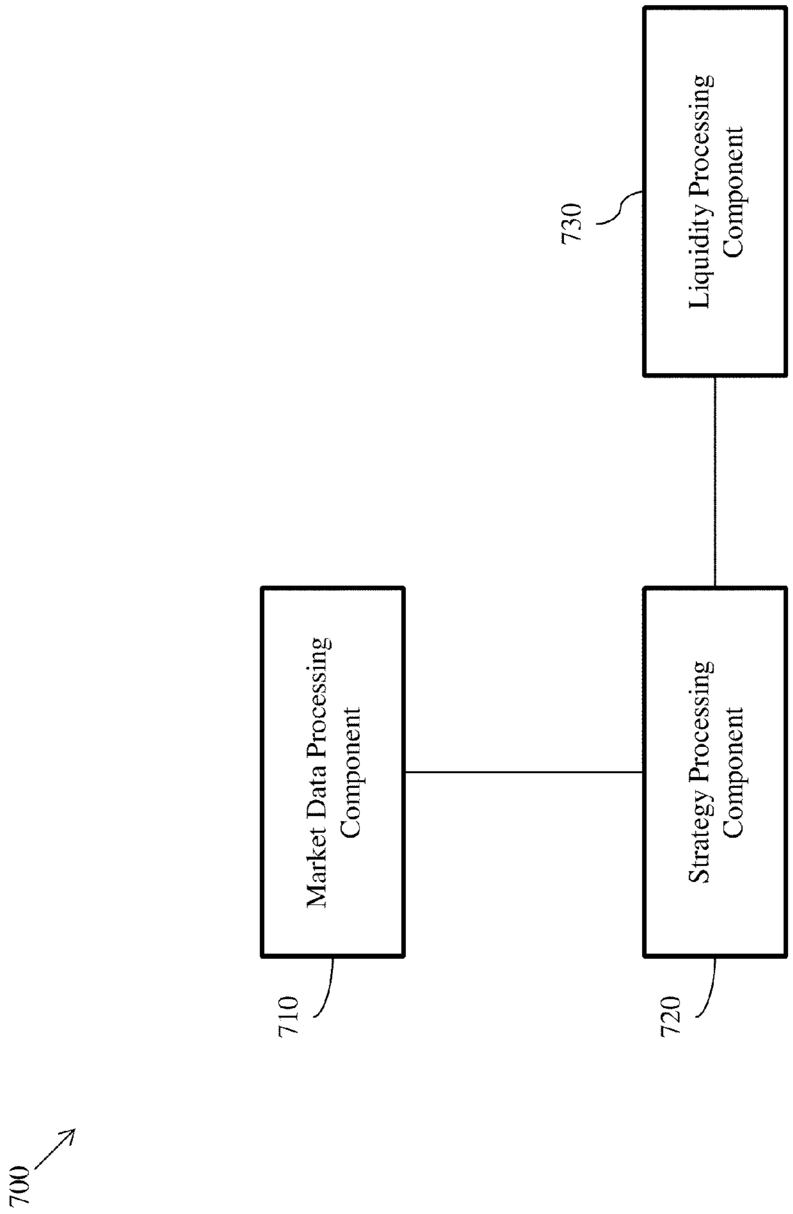
FIG. 7 illustrates a block diagram of a system for trading in an electronic trading environment according to an embodiment of the present inventions.

FIG. 7 illustrates a block diagram of a system 700 for trading in an electronic trading environment according to an embodiment of the present inventions. The system 700 includes a market data processing component 710, a strategy processing component 720, and a liquidity processing component 730.

The strategy processing component 720 is in communication with the market data processing component 710 and the liquidity processing component 730. In certain embodiments, the liquidity processing component 730 is in communication with the market data processing component 710.

In operation, market data for tradeable objects being traded as legs of a trading strategy is received by the market data processing component 710. The liquidity processing component 730 determines liquidity for one or more legs of the trading strategy. The strategy processing component 720 determines a quoting leg for the trading strategy to be quoted based on the determined liquidity. The strategy processing component 720 then sends a quoting order based on the determined quoting leg.

In certain embodiments, the market data processing component 710 is part of a client device similar to the client device 110 and/or 210, discussed above. In certain embodiments, the market data processing component 710 is part of a gateway similar to the gateway 120 and/or 220, discussed above. In certain embodiments, the market data processing component 710 is part of an exchange similar to the exchange 130 and/or 230, discussed above. In certain embodiments, the strategy processing component 720 is part of a client device similar to the client device 110 and/or 210, discussed above. In certain embodiments, the strategy processing component 720 is part of a gateway similar to the gateway 120 and/or 220, discussed above. In certain embodiments, the market strategy processing component 720 is part of an exchange similar to the exchange 130 and/or 230, discussed above. In certain embodiments, the liquidity processing component 730 is part of a client device similar to the client device 110 and/or 210, discussed above. In certain embodiments, the liquidity processing component 730 is part of a gateway similar to the gateway 120 and/or 220, discussed above. In certain embodiments, the market liquidity processing component 730 is part of an exchange similar to the exchange 130 and/or 230, discussed above.

The market data processing component 710 is adapted to receive market data from an electronic exchange relating to tradeable objects traded as legs of a trading strategy. The electronic exchange may be similar to the exchange 130 and/or 230, discussed above, for example. The trading strategy may be similar to the trading strategy 310, discussed above, for example. In certain embodiments, the trading strategy is a spread.

In certain embodiments, the market data received by the market data processing component 710 includes information about the volume traded for one or more tradeable objects of the trading strategy. For example, the market data may include price and trade information for tradeable objects that are being traded by a trader as part of a spread. In certain embodiments, the market data received by the market data processing component 710 includes information about volume on the inside market for one or more tradeable objects of the trading strategy. In certain embodiments, the market data received by the market data processing component 710 includes information about quantity available at one or more price levels for one or more tradeable objects of the trading strategy. In certain embodiments, the market data received by the market data processing component 710 includes information about the last trade price and/or quantity for one or more tradeable objects of the trading strategy. In certain embodiments, the market data received by the market data processing component 710 includes information about trades for one or more tradeable objects of the trading strategy.

The strategy processing component 720 is adapted to receive a definition for a trading strategy. The trading strategy may be similar to the trading strategy 310, discussed above, for example. As discussed above, the definition for the trading strategy may define a relationship between two or more tradeable objects to be traded. Once defined, tradeable objects in the trading strategy may then be traded together according to the defined relationship.

The strategy processing component 720 is adapted to receive a desired strategy price. As discussed above, the desired strategy price represents the price at which to buy or sell the trading strategy. The desired strategy price may be received from a user or from an automated trading program, for example.

The strategy processing component 720 is adapted to select a quoting leg based on a determined liquidity value. The liquidity value may be determined by the liquidity processing component 730 and is discussed in more detail below. As discussed above, in addition or in the alternative, the strategy processing component 720 may similarly select a lean leg based on the determined liquidity value in certain embodiments.

The strategy processing component 720 may select the quoting leg using techniques similar to those discussed above, for example. For example, the strategy processing component 720 may automatically select a quoting leg based on the determined liquidity. As another example, the strategy processing component 720 may select a quoting leg based on an input from a user.

As discussed above, the liquidity of one or more legs of a trading strategy may change over time. Thus, the selected quoting leg may change. For example, consider the situation of a spread with two legs (Leg A and Leg B), where Leg A has initially been selected to be quoted because Leg B is the leg determined to have more liquidity. If the liquidity of Leg B decreases and/or the liquidity of Leg A increases, Leg A may become the leg determined to have more liquidity. As a result, the strategy processing component 720 may switch the quoting leg from Leg A to select Leg B as the quoting leg. The strategy processing component 720 may automatically enter a new order to buy or sell the tradeable object of Leg B at a price based on the desired strategy price. The strategy processing component 720 may also automatically cancel a quoting order in Leg A.

In certain embodiments, the selection of the quoting leg is based on factors in addition to the determined liquidity. For example, the quoting leg may be selected based at least in part on market direction. As another example, the quoting leg may be selected based at least in part on a technical indicator such as Bollinger Bands, Relative Strength Index, Stochastics, Moving Average Crossover, and volume.

In certain embodiments, a trader may manually override a selected quoting leg. For example, if Leg A is automatically selected to be the quoting leg based on the determined liquidity, a trader may manually override the selected quoting leg to be Leg B. In certain embodiments, a selected quoting leg may be automatically overridden. For example, if a trader manually selected Leg A to be the quoting leg based on a liquidity indicator, an automated trading tool may automatically override the selected quoting leg to be Leg B because another factor may have higher priority than the determined liquidity.

In certain embodiments, a user might prefer some other action be taken besides cancelling an order when the quoting leg is switched. For example, the order may be cancelled after a predetermined timeout, the order may be moved to a price that is further off the inside market than the current order price rather than cancelling it, the order quantity may be changed (such as by deleting only a portion of the order quantity), the order type may be changed, or some other user-definable action may be taken on the order.

In certain embodiments, the strategy processing component 720 is adapted to provide an indicator of the liquidity of a leg. The indicator may be similar to the indicators discussed above, for example. For example, an indicator may be provided in a user interface for an automated trading tool. The indicator may be a colored icon or a number, for example. For example, each displayed leg of a trading strategy being traded with an automated trading tool may have a red/green icon that indicates whether the leg is liquid. As another example, the name of the most liquid tradeable object in a trading strategy may be displayed as the indicator.

The liquidity processing component 730 is adapted to determine a liquidity value for a market of a tradeable object of a leg of the trading strategy. The liquidity value may be predetermined or determined dynamically, for example. The liquidity processing component 730 may determine the liquidity value using one or more techniques similar to those discussed above, for example. The liquidity value may be determined base on market data received by the market data processing component 710, for example.

The liquidity for a market for a particular tradeable object (also referred to herein as simply the liquidity for the tradeable object and/or the liquidity for a leg) may be represented in a variety of ways. For example, the liquidity may be represented as a binary value: is the market for the tradeable object liquid, "yes" or "no." As another example, the liquidity may be represented as a parameter or weighting factor, such as a weight from 0.0 to 1.0. As another example, the liquidity may be represented as an absolute number such as the total quantity available in the market or the last traded quantity. As another example, the liquidity may be represented as a relative value, such as Leg B has three-times the liquidity of Leg A.

In certain embodiments, the liquidity processing component 730 is adapted to determine the liquidity based on the volume traded. For example, the liquidity may be determined based on the total volume traded for a tradeable object since the start of trading for a day. As another example, the liquidity may be determined based on the average daily volume. If a contract has an average daily volume of 1000 contracts/day and a trader wants to trade 100 contracts (10% of the average daily volume), the liquidity may be determined to be low for this trade. If a contract has a traded volume of 500,000 contracts from the beginning of the trading day and a trader wants to trade 100 contracts (0.02% of the volume), then the contract may be determined to have high liquidity. A liquidity value may be determined by subtracting the percentage of the volume from 1.0 (thus, for 10%, liquidity value is 1.0−0.1 (10%)=0.9) or by taking the inverse of the percentage (thus, for 10%, liquidity value is 1/10=0.1 and for 0.02%, liquidity value is 1/0.02=50). As another example, the liquidity may be determined based on volume traded over the past 10 minutes or the past 2 hours. As another example, the liquidity may be determined based on historical intraday time periods. USD/JPY from 4 pm CST until 12 am CST historically has greater volume (and thus may be determined to have higher liquidity relative to other times of day or other tradeable objects, for example). As another example, the volume traded may be compared to the volume traded over a different time interval (for example, last five minutes versus last hour), a threshold, a default order quantity, or a current order quantity.

In certain embodiments, the liquidity processing component 730 is adapted to determine the liquidity based on the volume on the inside market. For example, the liquidity may be determined based on the last traded quantity. As another example, the liquidity may be determined based on the total volume traded at the last traded price level. As another example, the volume traded on the inside market may be compared to the volume traded on the inside market over a different time interval (for example, last five minutes versus last hour), a threshold, a default order quantity, or a current order quantity.

In certain embodiments, the liquidity processing component 730 is adapted to determine the liquidity based on the quantity available. For example, if the market is sparse, then the market may be considered to not be liquid. As another example, if the quantity available at the inside market is greater than the average quantity available at other price levels then the market met be considered liquid. As another example, the liquidity may be determined by comparing the quantity available at the best bid to the quantity available at the best ask. As another example, the liquidity may be determined by comparing the quantity available at the two best price levels on the bid to the quantity available at the two best price levels on the ask. As another example, the liquidity may be determined based on the quantity available at the inside market excluding implied quantity. As another example, the liquidity may be determined based on the quantity available at the inside market excluding implied quantities that do not originate from at least "x" sources.

In certain embodiments, the liquidity processing component 730 is adapted to determine the liquidity based on price volatility. The price volatility is the price variance over a time period. For example, the time period may be a predefined number of minutes, hours, or days. The price volatility may be determined relative to another leg of the trading strategy or to a preceding time period, for example. For example, the price volatility for the preceding 10 minutes may be compared to the price volatility over the preceding hour.

In certain embodiments, the liquidity processing component 730 is adapted to determine the liquidity based on the relationship between market data for the tradeable object. For example, a liquidity value may be determined by subtracting the best bid price from the best ask price (the bid-ask spread) and comparing it to a threshold value. As another example, a liquidity value may be determined by dividing the bid-ask spread by the last traded price (LTP) to normalize the bid-ask spread to the market. Consider the case of a tight spread, where the bid is 10, the ask is 11, and the LTP is 10: (11−10)/10=0.1. Now consider the case of a wide spread, where the bid is 10, the ask is 15, and the LTP 10: (15−10)/10=0.5. The tight spread, with the smaller value may be considered more liquid than the wide spread. A liquid market is exemplified by numerous market participants seeking pricing parity, which results in a smaller bid-ask spread. The best bid price, the best ask price, or the midpoint of the bid-ask spread might be used instead of the LTP to normalize the bid-ask spread to the market, for example. As another example, the liquidity may be determined to be higher when more quantity is available at subsequent price levels as compared to when less quantity is available at subsequent price levels. A market where the next lower price level from the best bid has a quantity of 10 available is more liquid than when the quantity available is only 5.

In certain embodiments, the liquidity processing component 730 is adapted to determine the liquidity based on an order quantity. For example, liquidity may be determined based on the price impact of executing "x" contracts (a hypothetical order quantity) at the inside market. Price impact refers to how much the market moves when an order is executed. For example, if a trader has to sell 100 contracts at the market, they hope to minimize price impact and execute all sales at the current inside market. However, if there is not enough quantity available at the current inside market (here, the best bid), some of the contracts may get filled at a worse price (here, a lower price). The order quantity may be predefined, specified by a user, or based on an average quantity size for previously traded by the user for the particular tradeable object, for example.

In certain embodiments, the liquidity processing component 730 is adapted to determine the liquidity based on a trading range. For example, liquidity may be determined to be lower when the tradeable object is trading in a narrow range of prices. As another example, liquidity may be determined be higher when the tradeable object is trading in a larger range of prices.

In certain embodiments, the liquidity processing component 730 is adapted to determine the liquidity based on the quantity of recent trades. For example, if the last 5 trades were for a small quantity, liquidity may be determined to be low, whereas if the last 20 trades were for a large quantity, liquidity may be determined be high.

In certain embodiments, the liquidity processing component 730 is adapted to predetermine the liquidity. For example, the liquidity for a particular tradeable object may be determined based on historical data. As another example, the liquidity for a particular tradeable object may be set by a trader.

In certain embodiments, the liquidity processing component 730 is adapted to determine the liquidity dynamically. For example, the liquidity may be determined in real time using one or more of the techniques discussed above. The liquidity of a leg may change over time, for example.

In certain embodiments, the liquidity processing component 730 is adapted to provide an indicator of the liquidity of a leg. The indicator may be similar to the indicators discussed above, for example. For example, an indicator may be provided in a user interface for an automated trading tool. The indicator may be a colored icon or a number, for example. For example, each displayed leg of a trading strategy being traded with an automated trading tool may have a red/green icon that indicates whether the leg is liquid. As another example, the name of the most liquid tradeable object in a trading strategy may be displayed as the indicator.

The components, elements, and/or functionality of the system 700 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Figure 8:
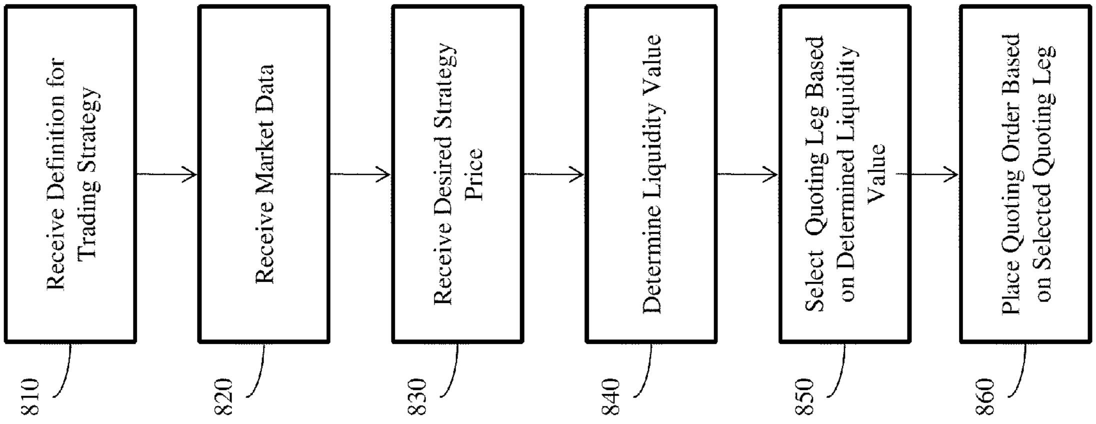
FIG. 8 illustrates a flowchart of a method for trading in an electronic trading environment according to an embodiment of the present inventions.

FIG. 8 illustrates a flowchart 800 of a method for trading in an electronic trading environment according to an embodiment of the present inventions. The method includes the following steps which will be described below in more detail. At step 810, a definition for a trading strategy is received. At step 820, market data is received. At step 830, a desired strategy price is received. At step 840, a liquidity value is determined. At step 850, a quoting leg is selected based on a liquidity value. At step 860, a quoting order is placed based on a selected quoting leg. The method is described with reference to elements of systems discussed above, but it should be understood that other implementations are possible.

At step 810, a definition for a trading strategy is received. The definition may be received by a strategy processing component similar to the strategy processing component 720, discussed above, for example. The trading strategy may be similar to the trading strategy 310, discussed above, for example. As discussed above, the definition for the trading strategy may define a relationship between two or more tradeable objects to be traded. Once defined, tradeable objects in the trading strategy may then be traded together according to the defined relationship.

At step 820, market data is received. The market data may be received by a market data processing component similar to the market data processing component 710, discussed above, for example. The market data may be received from an electronic exchange, for example. The electronic exchange may be similar to the exchange 130 and/or 230, discussed above, for example.

The trading strategy may be the trading strategy defined by the definition received at step 810, discussed above, for example. The trading strategy may be similar to the trading strategy 310, discussed above, for example. The trading strategy may include two or more legs for two or more tradeable objects, for example. The legs may be similar to the legs 320, discussed above, for example. In certain embodiments, multipliers are associated with one or more of the legs of the trading strategy. The multipliers may be similar to the multipliers 326, discussed above, for example.

The market data may include market data relating to one or more tradeable objects that are part of a trading strategy. For example, the market data may include price and trade information for tradeable objects that are being traded by a trader as part of a spread. In certain embodiments, the received market data includes information about volume on the inside market for one or more tradeable objects of the trading strategy. In certain embodiments, the received market data includes information about quantity available at one or more price levels for one or more tradeable objects of the trading strategy.

At step 830, a desired strategy price is received. The desired strategy price may be received by a strategy processing component similar to the strategy processing component 720, discussed above, for example. As discussed above, the desired strategy price represents the price at which to buy or sell the trading strategy. The trading strategy may be defined by the definition received at step 810, discussed above, for example. The desired strategy price may be received from a user or from an automated trading program, for example.

At step 840, a liquidity value is determined. The liquidity value may be determined by a liquidity processing component similar to the liquidity processing component 730, discussed above, for example. The liquidity value may be determined for a market of a tradeable object of a leg of the trading strategy. The liquidity value may be predetermined or determined dynamically, for example. The liquidity value may be determined using one or more techniques similar to those discussed above, for example. The liquidity value may be determined base on the market data received at step 820, discussed above, for example.

The liquidity for a market for a particular tradeable object (also referred to herein as simply the liquidity for the tradeable object and/or the liquidity for a leg) may be represented in a variety of ways. For example, the liquidity may be represented as a binary value: is the market for the tradeable object liquid, "yes" or "no." As another example, the liquidity may be represented as a parameter or weighting factor, such as a weight from 0.0 to 1.0. As another example, the liquidity may be represented as an absolute number such as the total quantity available in the market or the last traded quantity. As another example, the liquidity may be represented as a relative value, such as Leg B has three-times the liquidity of Leg A.

In certain embodiments, the liquidity is determined based on the volume traded. For example, the liquidity may be determined based on the total volume traded for a tradeable object since the start of trading for a day. As another example, the liquidity may be determined based on the average daily volume. If a contract has an average daily volume of 1000 contracts/day and a trader wants to trade 100 contracts (10% of the average daily volume), the liquidity may be determined to be low for this trade. If a contract has a traded volume of 500,000 contracts from the beginning of the trading day and a trader wants to trade 100 contracts (0.02% of the volume), then the contract may be determined to have high liquidity. A liquidity value may be determined by subtracting the percentage of the volume from 1.0 (thus, for 10%, liquidity value is 1.0−0.1(10%)=0.9) or by taking the inverse of the percentage (thus, for 10%, liquidity value is 1/10=0.1 and for 0.02%, liquidity value is 1/0.02=50). As another example, the liquidity may be determined based on volume traded over the past 10 minutes or the past 2 hours. As another example, the liquidity may be determined based on historical intraday time periods. USD/JPY from 4 pm CST until 12 am CST historically has greater volume (and thus may be determined to have higher liquidity relative to other times of day or other tradeable objects, for example). As another example, the volume traded may be compared to the volume traded over a different time interval (for example, last five minutes versus last hour), a threshold, a default order quantity, or a current order quantity.

In certain embodiments, the liquidity is determined based on the volume on the inside market. For example, the liquidity may be determined based on the last traded quantity. As another example, the liquidity may be determined based on the total volume traded at the last traded price level. As another example, the volume traded on the inside market may be compared to the volume traded on the inside market over a different time interval (for example, last five minutes versus last hour), a threshold, a default order quantity, or a current order quantity.

In certain embodiments, the liquidity is determined based on the quantity available. For example, if the market is sparse, then the market may be considered to not be liquid. As another example, if the quantity available at the inside market is greater than the average quantity available at other price levels then the market met be considered liquid. As another example, the liquidity may be determined by comparing the quantity available at the best bid to the quantity available at the best ask. As another example, the liquidity may be determined by comparing the quantity available at the two best price levels on the bid to the quantity available at the two best price levels on the ask. As another example, the liquidity may be determined based on the quantity available at the inside market excluding implied quantity. As another example, the liquidity may be determined based on the quantity available at the inside market excluding implied quantities that do not originate from at least "x" sources.

In certain embodiments, the liquidity is determined based on price volatility. The price volatility is the price variance over a time period. For example, the time period may be a predefined number of minutes, hours, or days. The price volatility may be determined relative to another leg of the trading strategy or to a preceding time period, for example. For example, the price volatility for the preceding 10 minutes may be compared to the price volatility over the preceding hour.

In certain embodiments, the liquidity is determined based on the relationship between market data for the tradeable object. For example, a liquidity value may be determined by subtracting the best bid price from the best ask price (the bid-ask spread) and comparing it to a threshold value. As another example, a liquidity value may be determined by dividing the bid-ask spread by the last traded price (LTP) to normalize the bid-ask spread to the market. Consider the case of a tight spread, where the bid is 10, the ask is 11, and the LTP is 10: $(11-10)/10=0.1$. Now consider the case of a wide spread, where the bid is 10, the ask is 15, and the LTP 10: $(15-10)/10=0.5$. The tight spread, with the smaller value may be considered more liquid than the wide spread. A liquid market is exemplified by numerous market participants seeking pricing parity, which results in a smaller bid-ask spread. The best bid price, the best ask price, or the midpoint of the bid-ask spread might be used instead of the LTP to normalize the bid-ask spread to the market, for example. As another example, the liquidity may be determined to be higher when more quantity is available at subsequent price levels as compared to when less quantity is available at subsequent price levels. A market where the next lower price level from the best bid has a quantity of 10 available is more liquid than when the quantity available is only 5.

In certain embodiments, the liquidity is determined based on an order quantity. For example, liquidity may be determined based on the price impact of executing "x" contracts (a hypothetical order quantity) at the inside market. Price impact refers to how much the market moves when an order is executed. For example, if a trader has to sell 100 contracts at the market, they hope to minimize price impact and execute all sales at the current inside market. However, if there is not enough quantity available at the current inside market (here, the best bid), some of the contracts may get filled at a worse price (here, a lower price). The order quantity may be predefined, specified by a user, or based on an average quantity size for previously traded by the user for the particular tradeable object, for example.

In certain embodiments, the liquidity is determined based on a trading range. For example, liquidity may be determined to be lower when the tradeable object is trading in a narrow range of prices. As another example, liquidity may be determined be higher when the tradeable object is trading in a larger range of prices.

In certain embodiments, the liquidity is determined based on the quantity of recent trades. For example, if the last 5 trades were for a small quantity, liquidity may be determined to be low, whereas if the last 20 trades were for a large quantity, liquidity may be determined be high.

In certain embodiments, the liquidity is predetermined. For example, the liquidity for a particular tradeable object may be determined based on historical data. As another example, the liquidity for a particular tradeable object may be set by a trader.

In certain embodiments, the liquidity is determined dynamically. For example, the liquidity may be determined in real time using one or more of the techniques discussed above. The liquidity of a leg may change over time, for example.

In certain embodiments, an indicator of the liquidity of a leg is provided. The indicator may be similar to the indicators discussed above, for example. For example, an indicator may be provided in a user interface for an automated trading tool. The indicator may be a colored icon or a number, for example. For example, each displayed leg of a trading strategy being traded with an automated trading tool may have a red/green icon that indicates whether the leg is liquid. As another example, the name of the most liquid tradeable object in a trading strategy may be displayed as the indicator.

At step 850, a quoting leg is selected based on a liquidity value. The quoting leg may be selected by a strategy processing component similar to the strategy processing component 720, discussed above, for example. The liquidity value may be the liquidity value determined at step 840, discussed above, for example. The liquidity value may be determined using techniques similar to those discussed above, for example. As discussed above, in addition or in the alternative, a lean leg may similarly be selected based on the liquidity value in certain embodiments.

In certain embodiments, the quoting leg is selected manually based on an indicator of liquidity. The indicator of liquidity may be similar to the indicators discussed above, for example. For example, a trader may manually select the quoting leg based on an indicator in a trading application indicating the determined liquidity. The quoting leg may be selected via an input device, for example. As another example, the quoting leg may be selected in response to receiving a command from a user.

In certain embodiments, the quoting leg is selected automatically. For example, an automated trading tool may automatically select a quoting leg based on the determined liquidity. The automated trading tool may select a less liquid leg to quote and thus lean on a more liquid leg, for example. As another example, an automated trading tool may quote in each leg with a determined liquidity above or below a threshold value. This may alternatively be viewed as the automated trading tool not quoting in a leg with a determined liquidity below or above (respectively) a threshold value (that is, only leaning on such a leg). If all legs meet the threshold to be selected for quoting, the automated trading tool may quote all of the legs. If all of the legs do not meet the threshold to be selected for quoting (or, all legs meet the threshold to be selected to be leaned on), then no legs may be selected for quoting. In this case, the strategy order may be viewed as being on hold because no legs meet the criteria to be selected as a quoting leg. As another example, an automated trading tool may select the least liquid or the most liquid leg to quote. As another example, an automated trading tool may select the two least liquid or two most liquid legs to quote. As another example, an automated trading tool may select all legs to quote except the most liquid or least liquid.

As discussed above, the liquidity of one or more legs of a trading strategy may change over time. Thus, the selected quoting leg may change. For example, consider the situation of a spread with two legs (Leg A and Leg B), where Leg A has initially been selected to be quoted because Leg B is the leg determined to have more liquidity. If the liquidity of Leg B decreases and/or the liquidity of Leg A increases, Leg A may become the leg determined to have more liquidity. As a result, an automated trading tool may switch the quoting leg from Leg A to select Leg B as the quoting leg. The automated trading tool may automatically enter a new order to buy or sell the tradeable object of Leg B at a price based on the desired strategy price. The automated trading tool may also automatically cancel a quoting order in Leg A.

In certain embodiments, the selection of the quoting leg is based on factors in addition to the determined liquidity. For example, the quoting leg may be selected based at least in part on market direction. As another example, the quoting leg may be selected based at least in part on a technical indicator such as Bollinger Bands, Relative Strength Index, Stochastics, Moving Average Crossover, and volume.

In certain embodiments, a trader may manually override a selected quoting leg. For example, if Leg A is automatically selected to be the quoting leg based on the determined liquidity, a trader may manually override the selected quoting leg to be Leg B. In certain embodiments, a selected quoting leg may be automatically overridden. For example, if a trader manually selected Leg A to be the quoting leg based on a liquidity indicator, an automated trading tool may automatically override the selected quoting leg to be Leg B because another factor may have higher priority than the determined liquidity.

In certain embodiments, a user might prefer some other action be taken besides cancelling an order when the quoting leg is switched. For example, the order may be cancelled after a predetermined timeout, the order may be moved to a price that is further off the inside market than the current order price rather than cancelling it, the order quantity may be changed (such as by deleting only a portion of the order quantity), the order type may be changed, or some other user-definable action may be taken on the order.

At step 860, a quoting order is placed based on a selected quoting leg. The quoting leg may be the quoting leg selected at step 850, for example. The quoting order may be placed by a strategy processing component similar to the strategy processing component 720, discussed above, for example.

The quoting order is placed for the tradeable object in the selected quoting leg. Whether the quoting order is to buy or sell the tradeable object in the selected quoting leg may be determined based on a strategy definition. The price and quantity for the quoting order may be based on the strategy definition, market data, and/or a desired strategy price. The strategy definition may be the definition received at step 810, discussed above, for example. The market data may be the market data received at step 820, discussed above, for example. The desired strategy price may be the desired strategy price received at step 830, discussed above, for example.

One or more of the steps of the method 800 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Certain embodiments of the present inventions may omit one or more of these steps and/or perform the steps in a different order than the order listed. For example, some steps may not be performed in certain embodiments of the present inventions. As a further example, certain steps may be performed in a different temporal order, including simultaneously, than listed above.

While the present inventions have been described with reference to certain embodiments, it will be understood by those skilled in the art that various changes may be made and equivalents may be substituted without departing from the scope of the inventions. In addition, many modifications may be made to adapt a particular situation or material to the teachings of the inventions without departing from their scope. Therefore, it is intended that the inventions not be limited to the particular embodiments disclosed, but that the inventions will include all embodiments falling within the scope of the claims.

The invention claimed is:

1. A method for trading in an electronic trading environment, the method including:

receiving by a computing device a definition for a trading strategy, wherein the trading strategy includes a first tradeable object and a second tradeable object;

receiving by the computing device market data for the first tradeable object and the second tradeable object;

receiving by the computing device a desired strategy price;

determining by the computing device a first liquidity value for the first tradeable object based on the received market data;

automatically selecting by the computing device a quoting leg based on the determined first liquidity value; and placing by the computing device a quoting order for the tradeable object corresponding to the selected quoting leg based on the definition for the trading strategy and the desired strategy price.

2. The method of claim 1, further including determining by the computing device a second liquidity value for the second tradeable object based on the received market data, wherein the automatically selecting of the quoting leg is further based on the determined second liquidity value.

3. The method of claim 1, wherein the first liquidity value is predetermined.

4. The method of claim 3, wherein the first liquidity value is specified by a user.

5. The method of claim 3, wherein the first liquidity value is predetermined based on historical market data.

6. The method of claim 1, wherein the first liquidity value is dynamically determined.

7. The method of claim 6, further including automatically selecting by the computing device a second quoting leg based on a change in the dynamically determined first liquidity value and placing by the computing device a second quoting order for the tradeable object corresponding to the selected second quoting leg.

8. The method of claim 7, further including cancelling the quoting order.

9. The method of claim 1, further including providing an indicator corresponding to the determined first liquidity value.

10. The method of claim 9, wherein the indicator is provided via a user interface of a trading application.

11. A computer readable medium having stored therein instructions executable by a processor, wherein the instructions are executable to carry out acts including:

receive a definition for a trading strategy, wherein the trading strategy includes a first tradeable object and a second tradeable object;

receive market data for the first tradeable object and the second tradeable object;

receive a desired strategy price;

determine a first liquidity value for the first tradeable object based on the received market data;

automatically select a quoting leg based on the determined first liquidity value; and place a quoting order for the tradeable object corresponding to the selected quoting leg based on the definition for the trading strategy and the desired strategy price.

12. The computer readable medium of claim 11, further including instructions executable to determine a second liquidity value for the second tradeable object based on the received market data, wherein the automatically selecting of the quoting leg is further based on the determined second liquidity value.

13. The computer readable medium of claim 11, wherein the first liquidity value is predetermined.

14. The computer readable medium of claim 13, wherein the first liquidity value is specified by a user.

15. The computer readable medium of claim 13, wherein the first liquidity value is predetermined based on historical market data.

16. The computer readable medium of claim 11, wherein the first liquidity value is dynamically determined.

17. The computer readable medium of claim 16, further including instructions executable to automatically select a second quoting leg based on a change in the dynamically determined first liquidity value and place a second quoting order for the tradeable object corresponding to the selected second quoting leg.

18. The computer readable medium of claim 17, further including instructions executable to cancel the quoting order.

19. The computer readable medium of claim 11, further including instructions executable to provide an indicator corresponding to the determined first liquidity value.

20. The computer readable medium of claim 19, wherein the indicator is provided via a user interface of a trading application.

* * * * *